United States Patent [19]
Klein

[11] 3,953,560
[45] Apr. 27, 1976

[54] METHOD OF INJECTION MOLDING STRUCTURAL FOAM FOLDING SLAT STRUCTURES

[75] Inventor: André Klein, Durban, South Africa

[73] Assignee: Polycrate (Proprietary) Limited, Pinetown, South Africa

[22] Filed: Aug. 28, 1974

[21] Appl. No.: 501,228

[30] Foreign Application Priority Data
Sept. 5, 1973   South Africa...................... 73/6098

[52] U.S. Cl............................. 264/50; 160/229 R; 264/54; 264/294; 264/296; 264/328; 264/DIG. 83
[51] Int. Cl.² ...................... B29D 27/00; B29F 1/00
[58] Field of Search .......... 264/51, 53, 54, DIG. 83, 264/321, 322, 294, 295, 296, 328, 320; 160/229 R, 229 B

[56] References Cited
UNITED STATES PATENTS

| | | | |
|---|---|---|---|
| 2,878,153 | 3/1959 | Hacklander | 264/321 X |
| 2,978,020 | 4/1961 | Paulsrude | 160/229 R X |
| 3,222,437 | 12/1965 | Schilling | 264/321 UX |
| 3,268,636 | 8/1966 | Angell | 264/DIG. 83 |
| 3,436,446 | 4/1969 | Angell | 264/DIG. 83 |
| 3,447,199 | 6/1969 | Trimble | 264/320 X |
| 3,454,694 | 7/1969 | Delaire et al. | 264/295 X |
| 3,632,729 | 1/1972 | Bielfeldt | 264/DIG. 83 |
| 3,767,742 | 10/1973 | Robin | 264/DIG. 83 |

FOREIGN PATENTS OR APPLICATIONS
46-1880   1/1971   Japan.................................. 264/295

OTHER PUBLICATIONS
Czerski, J., "Injection–Moulded Foams," In Plastics & Polymers, Dec. 1971, pp. 406–411.

Primary Examiner—Philip Anderson
Attorney, Agent, or Firm—Ladas, Parry, Von Gehr, Goldsmith & Deschamps

[57] ABSTRACT

The invention relates to structures such as folding (tambour) doors comprising longitudinal juxtaposed slats and comprises a method of making such structures by introducing a molten synthetic resinous mass containing a foaming agent into a mould, permitting foaming of the mass and compressing the mass with a ribbed mould plunger to a predetermined distance above the floor of the mould to constitute the hinges.

3 Claims, 1 Drawing Figure

U.S. Patent   April 27, 1976   3,953,560
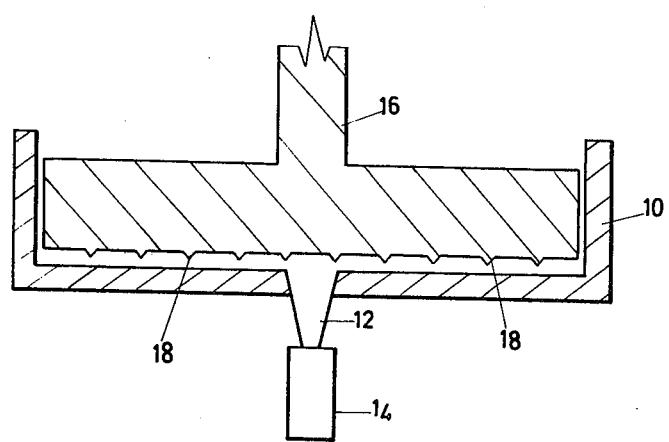

METHOD OF INJECTION MOLDING STRUCTURAL FOAM FOLDING SLAT STRUCTURES

This invention relates to structures requiring longitudinal juxtaposed slats capable of being folded or rolled and is particularly concerned with roller doors or, as they are known at least in America, tambour doors.

In the prior art such doors have comprised longitudinally juxtaposed slats having a backing of a flexible sheet material or being interconnected by hook or other formations.

It is an object of the present invention to provide a much simpler method of producing a roller door.

A further object of the invention is to provide a roller door of robust integral construction wherein the slats do not lose their position as can be the case in prior art arrangement.

According to the invention there is provided a method of forming a structure of longitudinally juxtaposed slats capable of being folded or rolled including the steps of introducing a molten synthetic resinous mass containing a foaming agent, into a mould, permitting the foaming agent to cause foaming of the mass, and compressing the foamed mass with a ribbed mould plunger to a predetermined distance above the floor of the mould.

After the compressed molten mass has solidified the integral roller door presenting a succession of slats and hinges is removed from the mould.

The mould plunger should be depressed substantially coincidentally with or just after the filling of the mould by the foamed molten mass.

The ribs of the plunger are preferably triangular and spaced apart to define the slats, the radiused apices of the triangles stopping in their downward movement to a position just above the floor of the mould so that the hinges between adjacent slats are formed. The distance above the floor will vary for different resinous compositions and for the different purposes to which the invention may be put, but for roller doors for cabinets (such as kitchen cabinets, for example), the distance will be of the order of 0.1 to 0.03 cm. To give the hinges maximum flexibility it is desirable to submit them to mechanical flexing shortly after the removal of the door from the mould.

It will be appreciated that the foaming operation first takes place when the resin mass is introduced into the mould cavity, and the descent of the plunger must, for most compositions, be virtually coincident or just sequential to the introduction of the resin or at least coincident or just sequential to the foaming step.

Many resinous materials may be used, but the superior bending qualities of polypropylene make it the material of choice.

The invention also extends to an integral structure comprising a series of longitudinally juxtaposed slats separated by thin hinge portions, the structure being composed of a foamed resinous material.

The structure of the invention can be manufactured in large dimensions from which any desired size length can be cut. It is also possible to manufacture it in a continuous or semi-continuous manner to practically indefinite lengths.

The invention may be used as room doors, dividers, shower curtains, kitchen cupboards, office furniture, sliding doors for other purposes, and the like.

An embodiment of the invention is described below with reference to the accompanying diagram which is a cross-section through a mould for use in the invention.

In the diagram a mould 10 has an inlet 12 for a resinous mass including a foaming agent (for example molten polypropylene containing dissolved nitrogen or a chemical foaming agent). A suitable injection system 14 is provided to force the molten mass into the mould. When a predetermined volume of the mass has been introduced and the foaming action has ceased or is just about to cease, a plunger 16 having triangular formations 18 is brought down and the mass is compressed until the apices of the triangles are at a predetermined distance above the floor of the mould 10.

The quantity of molten mass introduced into the mould and the degree of compression of the plunger 16 are chosen so that a predetermined density increase of the foamed mass is obtained. In the manufacture of structures for use as roller doors using polypropylene, a polypropylenenitrogen mass of density about 0.4 is compressed to a density of about 0.6 when the apices of the triangles are approximately 0.04 cm from the floor of the mould.

It will be appreciated that the mould may carry a pattern (such as a woodgrain pattern or the like) in which case the resulting product will show a decorative effect. Furthermore, other means of decoration may be employed, such as coating and/or laminating with flexible sheet materials.

I claim:

1. A method of forming a structure comprising longitudinally juxtaposed slats separated by hinge formations to be capable of being folded or rolled, including the steps of introducing a molten synthetic resinous mass containing a foaming agent into a mould, permitting the foaming agent to cause foaming of the mass, and compressing the whole area of the mass with a monolithic ribbed mould plunger in a single step to a predetermined distance above the floor of the mould before the mass solidifies.

2. The method as claim in claim 1 in which the mould plunger is depressed substantially coincidentally with the completion of the foaming action.

3. The method of claim 1 in which the ribs of the plunger are substantially triangular.

* * * * *